July 31, 1962    F. E. KHATTAR ET AL    3,046,626
SELF-CLOSING SELF-LOCKING SAFETY PIN
Filed Feb. 19, 1960    2 Sheets-Sheet 1
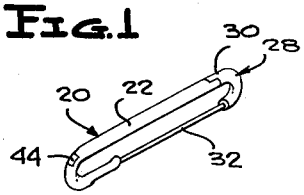
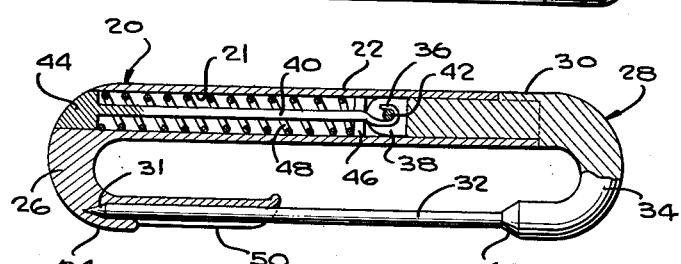
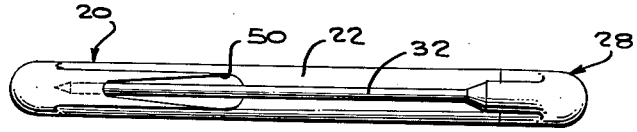
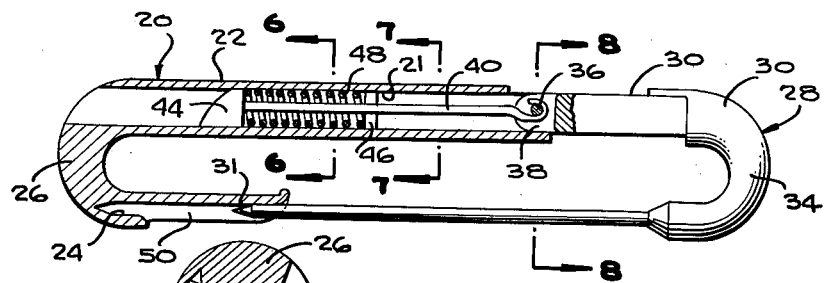
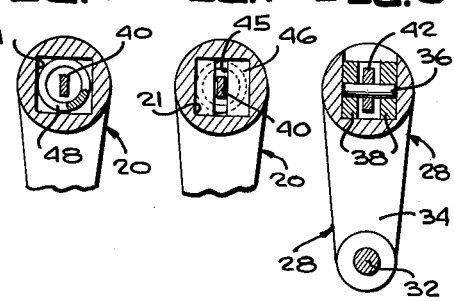
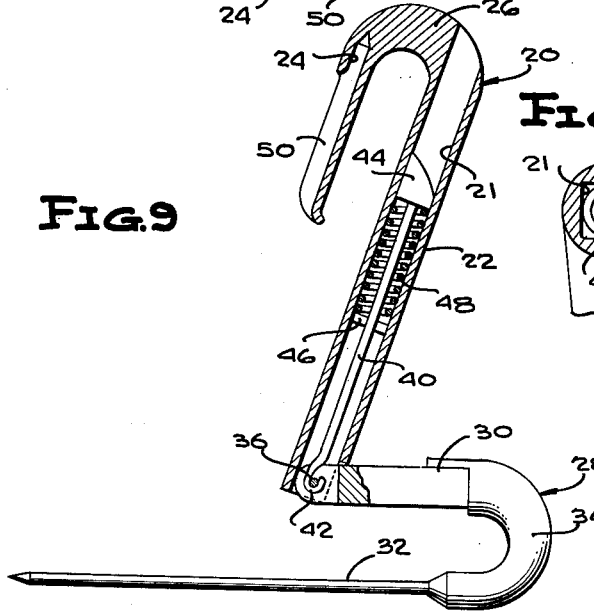
INVENTORS
FERDINAND E. KHATTAR,
JEAN E. KHATTAR &
ANGE E. KHATTAR
BY
McMorrow, Berman & Davidson
ATTORNEYS July 31, 1962   F. E. KHATTAR ET AL   3,046,626
SELF-CLOSING SELF-LOCKING SAFETY PIN
Filed Feb. 19, 1960   2 Sheets-Sheet 2
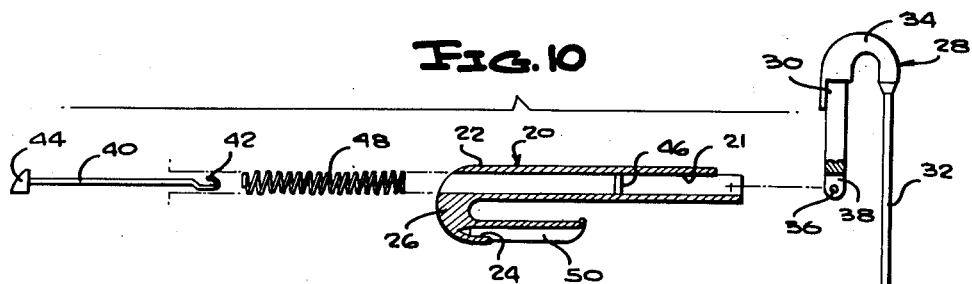
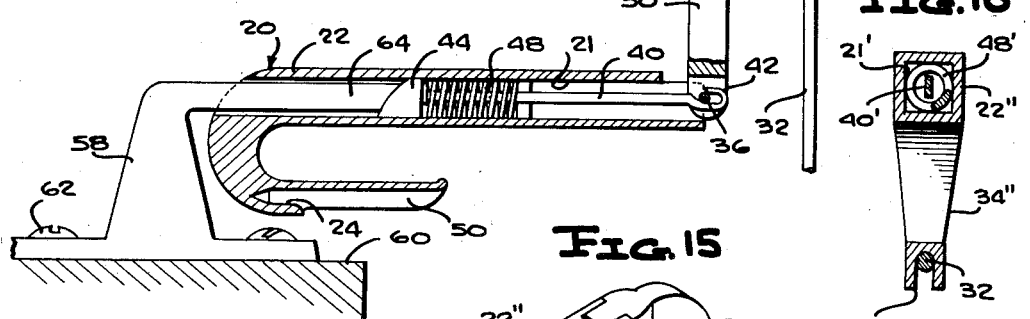
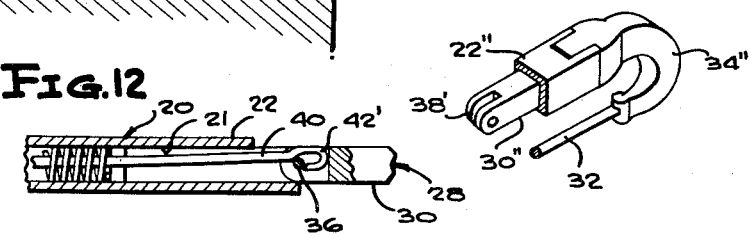
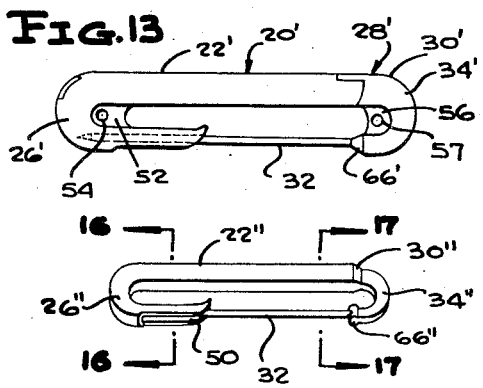
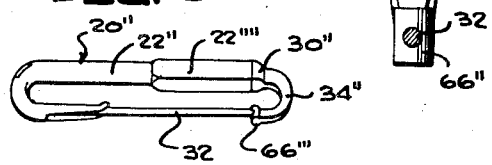
INVENTORS
FERDINAND E. KHATTAR,
JEAN E. KHATTAR &
ANGE E. KHATTAR
BY
McMorrow, Berman & Davidson
ATTORNEYS United States Patent Office 3,046,626
Patented July 31, 1962

3,046,626
SELF-CLOSING SELF-LOCKING SAFETY PIN
Ferdinand E. Khattar, Tripoli, Lebanon (% Government Guest House, Suleibikhat, Kuwait, Arabia), and Jean E. Khattar and Ange E. Khattar, both of Meetein St., Tripoli, Lebanon
Filed Feb. 19, 1960, Ser. No. 9,914
1 Claim. (Cl. 24—158)

The present invention relates to a self-closing, self-locking safety pin.

Presently in use and previously proposed have been safety pins for pinning together one or more layers of fabrics. A common use for safety pins is to secure articles of clothing, such as diapers and the like, about an infant's or child's body. The inadvertent opening of a safety pin so used is to be avoided im possible for safety reasons. Many of the pins proposed are designed so as to close automatically in order that the inadvertent opening of such a pin be obviated. Few of such self-closing pins have met with commercial success and a principal defect in such pins is that the pins are complicated in structure, have a relatively large number of components not easily assembled, and do not lend themselves to manufacture by conventional machinery at reasonable cost.

An object of the present invention is to provide a self-closing, self-locking safety pin which is spring-biased to the closed position in which the prong thereof is received in a socket and is covered or guarded, one which requires a manually applied pulling force to the ends thereof to shift the prong out of the socket, and one which automatically returns to the closed position when released from the fingers of the hand of a user.

Another object of the present invention is to provide a self-closing, self-locking safety pin including a shank and a prong normally parallel to the shank and one which, when in the open position, has the prong at an angle to the shank.

A further object of the present invention is to provide a self-closing, self-locking safety pin which has few components, one which lends itself to fabrication with ease and facility on conventional machinery, one which is assembled with ease, one which is simple in construction and sturdy in structure, and one which may be manufactured in large quantities at reasonable cost.

A still further object of the present invention is to provide a self-closing, self-locking safety pin which may be manufactured of metal, plastic, or other materials found suitable, one which may be assembled without the use of special tools or processes such as brazing or welding or the like, and one which is highly effective in action.

These and other objects and advantages of the present invention will be fully apparent from the following description when taken in conjunction with the annexed drawings, in which:

FIGURE 1 is an isometric view of the safety pin of the present invention;

FIGURE 2 is a plan view of the safety pin, on an enlarged scale, as seen from the top;

FIGURE 3 is a view taken on the line 3—3 of FIGURE 2;

FIGURE 4 is a plan view of the pin, as seen from the bottom or prong side;

FIGURE 5 is a view, on an enlarged scale, partially in section, showing the prong withdrawn from the socket, prior to opening of the pin;

FIGURE 6 is a view, on an enlarged scale, taken on the line 6—6 of FIGURE 5;

FIGURE 7 is a view, on an enlarged scale, taken on the line 7—7 of FIGURE 5;

FIGURE 8 is a view, on an enlarged scale, taken on the line 8—8 of FIGURE 5;

FIGURE 9 is a view, partially in section, showing the pin in fully open condition;

FIGURE 10 is an exploded view, partially in section, of the pin;

FIGURE 11 is a view, partially in section, showing how the pin is assembled;

FIGURE 12 is a fragmentary sectional view, showing a modification of the hook employed to connect the sections of the safety pin together;

FIGURE 13 is a view in elevation of a modified form of the safety pin according to the present invention;

FIGURE 14 is a view of a further modified form of the invention, the pin being tilted;

FIGURE 15 is an isometric view of a portion of one of the sections of the assembly shown in FIGURE 14;

FIGURE 16 is a view on an enlarged scale, taken on the line 16—16 of FIGURE 14;

FIGURE 17 is a view on an enlarged scale, taken on the line 17—17 of FIGURE 14; and FIGURE 18 is a view of a still further modified form of the safety pin according to the present invention, the pin being tilted.

Referring in greater detail to the drawings in which like numerals indicate like parts throughout the several views, with reference to FIGURES 1 to 11, inclusive, the safety pin according to the present invention comprises a first section 20 including a shank 22 and a socket 24 extending parallel to the shank 22 adjacent to and spaced from one end of the shank 22. The socket 24 faces in the same direction as the other end of the shank 22 remote from the point of connection of an arcuately curved extension 26 which projects from the first-named end of the shank 22, the socket 24 being carried on the extension 26.

The safety pin includes a second section 28 including a shank 30 and a prong element 32 extending parallel to the shank 30 adjacent to and spaced from one end of the shank 30 and facing in the same direction as the socket 24 or the other end of the shank 30.

The second section 28 includes another arcuately curved extension 34 projecting from one end of the shank 30 and carrying the prong element 32.

Means is provided connecting the shanks 22 and 30 together for movement of the shank 30 from the aligned position (FIGURE 1) to a position in which the shank 30 is at an angle with respect to the shank 22 with the prong element 32 parallel to the shank 30, as shown in FIGURE 9.

Specifically, this connecting means includes a pivot pin 36 extending through the bifurcated end portion 38 (FIGURES 3 and 5) of the shank 30, and a spring-biased rod 40 which is slidably mounted within the square bore 21 of the shank 22.

The rod 40 has a hook 42 on one end releasably embracing the pivot pin 36, and a head 44 on the other end.

The shank 22 of the first section 20 is provided with a slotted plug or partition 46 intermediate the ends thereof, the rod 40 being slidable through the slot 45 in the partition 46, as shown most clearly in FIGURE 7.

A coil spring 48 is circumposed about the portion of the rod 40 between the head 44 and the partition 46 and has one end bearing against the head 44 and the other end bearing against the partition 46.

The spring 48 biases the rod 40 to the position in which the second section shank 30 is in alignment with and extends into the shank 22 of the section 20 through one end thereof with the prong element 32 extending toward the socket 24 and having free end portion thereof seated within the socket 24, as in FIGURE 3. When the sections 20 and 28 are in the closed position relative to each other, the arcuately curved extensions 26 and 34 face each other.

The socket 24 is shown in FIGURES 3 and 5 to have an entrance 50 opening out of the side away from the shank 22. In a preferred form of the invention, the socket 24 is of a length substantially one-third that of the entrance 50, although such proportion is not critical and may be varied to a greater or lesser length as found practical in the manufacture of the safety pin of the present invention.

In FIGURE 13, a first modified form of the safety pin of the present invention is shown. The section 20' of the pin is provided with a web 52 extending inwardly of the extension 26'. The web 52 is provided with an aperture 54. The section 28' is provided with another web 56 extending inwardly of the extension 34' and has an aperture 57 therethrough.

In FIGURE 14, another modified form of the invention is shown in which the shanks 22" and 30" of the safety pin, together with their associated extensions 26" and 34" are square in cross-sectional configuration, with the extension 34" of a smaller cross-sectional area, as shown most clearly in FIGURE 15. The prong element 32 is secured to the end of the extension 34" and is identical with the prong element 32 of the form of the invention described in FIGURES 1 to 10, inclusive. Additionally, the shank 22" is hollow and has a square bore therein, as designated by the numeral 21' in FIGURES 16 and 17. Another coil spring 48' is positioned within the bore 21' and is circumposed about a rod 40' which has one terminating in a hook engageable with a pivot pin which connects the shanks 22" and 30" together, neither the hook nor the pivot pin being shown, the bifurcated end portion of the shank 30" being shown and designated by the numeral 38'.

In FIGURE 18, there is shown a still further modified form of the invention in which the safety pin section 20" has a round portion of its shank designated by the numeral 22''' and a square portion of its shank designated by the numeral 22''''. This form of the safety pin has the prong element 32, as previously described, and the extension 34" of cross-sectional configuration and shank 30", as previously described with reference to FIGURES 14 to 17, inclusive. Within the safety pin shown in FIGURE 18 are the same components of the safety pin shown in FIGURES 14 to 17, inclusive, and heretofore described.

With reference to FIGURE 11, a tool for use in assembling the safety pin of the present invention is shown and designated by the reference numeral 58. The tool 58 is secured to a supporting surface 60 by means of wood screws 62 or other suitable means. The tool includes an extension 64 disposed horizontally and has its free end conformably shaped to fit the sloping face of the rod head 44. The tool 58 is employed to assemble the second section of either of the forms of the invention on the first section. As a means and method of assembling the sections together is the same for each of the embodiments of the invention, the method will be described with reference to the form of the invention shown in FIGURES 1 to 10, inclusive.

To assemble the second section of the safety pin on the first section, the hollow shank 22 is slipped over the projection 64 so that the free end of the latter engages the head 44 and compresses the spring 48. This projects the hook 42 out of the free end of the shank 22 to a position in which the pin 36 is easily and with facility slipped into the hook 42. The shank 22 is then slipped off of the projection 64, freeing the spring 48 for expansive movement, drawing the rod 40 within the shank 22 and effecting the swing of the section 28 from the position at an angle to the section 20 to a position in alignment with the section 20 and with the prong element 32 facing the entrance 50 and entering therein for seating in the socket 24.

In use, a manually applied pulling force is applied by the fingers of the hand of a user to the sections 20 and 28 of the safety pin shown in FIGURES 1 to 10, inclusive, and to the respective sections of the safety pins shown in FIGURES 13, 14, and 18, the pulling force being of a magnitude such as to compress the spring 48 between the rod head 44 and the partition 46. This results in pulling the pointed end portion of the prong element 32 out of the socket 24 and also results in pulling the portion of the shank 30 out of the shank 22 to a position in which the pin 36 permits pivotal movement of the section 28 relative to the section 20 about the pin 36 as an axis from the position in which the first and second sections are in alignment to a position in which the second section is at an angle to the first section. This positions the prong element 32 so that it is readily inserted into a fabric or other material to be pinned.

Now, with the prong element 32 facing the material to be pinned and with the arcuately curved extension 34 firmly grasped preferably between the thumb and middle finger and the first section 20 kept in the open condition by a light touch of the index finger, the user passes the prong through the material or garment, momentarily making sure that its pointed end portion is not imbedded therein.

Upon release of the first section 20 from the index finger, the spring 48 exerts its force to swing the first section to the aligned position with the entrance 50 first shielding the pointed end of the prong element 32 and then upon completion of the expansion of the spring 48 and the resultant sliding movement of the shank 22 over the shank 30, the entrance 50 slides over the pointed end portion of the prong element 32 until it is again completely covered and enclosed by socket 24. The user now ceases hold of the safety pin which has its pointed end portion remaining seated in the socket 24 until a further pulling force is applied to the sections 20 and 28.

With reference to FIGURE 12, a modified form of the hook is shown which connects the rod 40 to the pivot pin 36 of the shank 30. In this case, the hook 42' is inverted with respect to the previously described and illustrated hook 42 for the purpose of expediting the attachment of the sections 20 and 28 together.

With further reference to FIGURES 3, 13, 14, and 18, it will be seen that the end of the prong element 32 remote from the free end thereof terminates in an abutment which limits the movement of the prong element 32 into fabric or clothing through which the prong element is inserted, such abutment being designated in FIGURE 3 by the reference numeral 66, in FIGURE 13 by the reference numeral 66', in FIGURE 14 by the reference numeral 66", and in FIGURE 18 by the reference numeral 66'''. The insertion of the prong element 32 into the fabric and the closing of the prong element 32 is limited by engagement of the fabric or clothing with the round edge of the entrance 50.

Additionally, it will be noted that the socket 24 is throat-like in configuration ending in a diminishing tube. Also, it will be noted that the length of the entrance 50 is the same as that of the prong element's outwardly sliding movement when the sections 20 and 28 are grasped by the fingers of the user and a pulling movement is applied thereto.

The arcuately curved extensions 26 and 34, 26', 34', 26", 34", serves as handles for the application of a pulling force to the sections for pulling the safety pin from the closed position shown in FIGURES 2 to 5 to the fully open position shown in FIGURE 9. Also, the arcuately curved extension 34 serves as a handle by which the safety pin is held for inserting it into fabric or for the purpose of withdrawing it therefrom.

While it is illustrated in FIGURES 6 to 8 that the bore 21 is square in configuration, a round bore would do as well if means were provided for preventing the rotation of the shank 30 within the shank 22.

In a preferred form of the invention, the shank 30 is snugly fitted within the bore 21 which prevents the slightest rotation of the shank 30 within the bore 21. Also, the gap at the end of the shank 22 nearest to the shank 30 is as deep and as wide as the shank 30 is broad and thick, respectively, which serves, when the pin is being opened, to uncover a hinge of which the pivot pin 36 constitutes the male part and the hook 42 the corresponding female part.

When using the form of the invention shown in FIGURE 13, the webs 52 and 56 serve to retain parallelism between the shank 22 and the entrance 50 and the shank 30 on the prong element 32, respectively.

It will be noted that the rod 40, employed in each of the forms of the invention above illustrated and described, is flat and is in thickness an exact fit of the slot of the partition 46 which serves to prevent, when the safety pin is fully open, any axial rotation of the section 28 relative to the section 20.

It will be seen therefore that the safety pin of the present invention in each of its forms is an improvement over the presently employed safety pins for many reasons. Chiefly, the safety pin is fully automatic in operation in its movement from an open position to a closed position. This prevents injuries to children or infants who have, as in the past, a habit of putting things in their mouths and frequently swallowing the same. An open safety pin in the throat or stomach of an infant has been proved in the past to be a major cause of severe injury and often death of the infant. It is obvious from the foregoing that the safety pin of the present invention, if swallowed, will remain in the closed position and will not allow the prong element to be exposed in any manner whatsoever to scratch or puncture the lining of the throat or stomach when swallowed.

The safety pin of the present invention may be manufactured of metal, plastic, or any material found suitable and wholly of one material or in any combination of materials found practical.

What is claimed is:

A safety pin comprising a first section including a hollow shank and a socket extending parallel to said shank adjacent to and spaced from one end of said shank and facing in the same direction as the other end of said shank, a second section including a shank and a prong element extending parallel to said shank adjacent to and spaced from one end of said shank and facing in the same direction as the other end of said shank, said second section being arranged so that the other end of the shank is in alignment with and extends into the other end of the shank of the first section with the prong element extending toward said socket and having the free end portion loosely seated in said socket, the shank of said second section being slidably movable in response to the application of a manually applied pulling force to said second section from the position within said first section shank to a position exteriorly of said first section shank one end, means embodying a transversely-disposed pivot pin extending through the other end of the shank of said second section connecting said shanks together for movement from the aligned position to a position in which the shank of said second section is at an angle with respect to the shank of said first section with the prong element parallel to the shank of said second section when said second section shank has been moved to the exterior position, and spring means operatively connected to the shank of said first section and said pivot pin for biasing said shanks to the aligned position.

References Cited in the file of this patent
UNITED STATES PATENTS

| 703,715 | Wentzel | July 1, 1902 |
| 2,057,006 | Caccamise | Oct. 13, 1936 |
| 2,246,495 | Alessi et al. | June 24, 1941 |
| 2,822,594 | Scheemaeker | Feb. 11, 1958 |

FOREIGN PATENTS

| 531,937 | France | Nov. 3, 1921 |